United States Patent [19]

Suzuki

[11] Patent Number: 4,950,110
[45] Date of Patent: Aug. 21, 1990

[54] ROTATING TOOL AND TRACTION DRIVE UNIT THEREFOR

[75] Inventor: Keiji Suzuki, Osaka, Japan

[73] Assignee: Koya Seiko Co., Ltd., Osaka, Japan

[21] Appl. No.: 301,585

[22] Filed: Jan. 26, 1989

[30] Foreign Application Priority Data

| Jan. 26, 1988 | [JP] | Japan | 63-8239[U] |
| Dec. 29, 1988 | [JP] | Japan | 63-169446 |
| Dec. 29, 1988 | [JP] | Japan | 63-169447 |
| Dec. 29, 1988 | [JP] | Japan | 63-169448 |

[51] Int. Cl.⁵ .................... B23B 47/04; F16H 13/08
[52] U.S. Cl. ................................ 408/126; 475/183
[58] Field of Search ........................ 408/126; 74/798

[56] References Cited

U.S. PATENT DOCUMENTS

| 1,017,910 | 2/1912 | Rennerfelt | 74/798 |
| 1,545,243 | 7/1925 | Fletcher | 74/798 |
| 2,521,585 | 9/1950 | Kurtz et al. | 74/798 |
| 3,084,570 | 4/1963 | Holder | 74/798 |
| 3,244,026 | 4/1966 | de Kay | 74/798 |
| 4,121,331 | 10/1978 | Fukuma et al. | 74/798 |

FOREIGN PATENT DOCUMENTS

| 113357 | 6/1984 | Japan | 74/798 |
| 55460 | 3/1986 | Japan | 74/798 |

*Primary Examiner*—Daniel Howell

[57] ABSTRACT

A rotating tool includes a drive source, a work piece, and a traction drive unit intercoupled between the drive source and work piece. The traction drive unit includes a unit case having a through-hole, a drive shaft and a follower shaft inserted into the through-hole and supported via a rolling bearing, and a plurality of planet rollers installed between the rolling bearing and the drive shaft in a frictionally rotatable condition and supported at the side of the follower shaft.

6 Claims, 5 Drawing Sheets

ROTATING TOOL AND TRACTION DRIVE UNIT THEREFOR

BACKGROUND OF THE INVENTION

The present invention relates to a traction drive unit suitable for a rotating tool, such as a hand tool or a precision hole cutting machine adapted to cut laminated layers.

A conventional hand tool is such that power generated by a motor is decelerated via a gear type decelerator and transmitted to an output shaft to which a drill or the like is coupled. However, the conventional hand tools have the following default. Since the output shaft is directly coupled to the motor via the gear type decelerator, the motor can be abruptly stopped from rotating when excessive torque is applied to the output shaft.

In the case of a hand tool, the whole drill is vibrated so that an operator receives a shock and is in danger of the hand tool dropping.

In a conventional precision hole cutting machine, using a traction drive mechanism of a conventional planet type for laminated layers, the vibration of a motor is directly transmitted to a spindle via gears so that preciseness of the hole cutting is reduced. Further, in hole cutting a very thin film of metal, the metal foil may turn over and any precise hole cutting is therefore difficult.

SUMMARY OF THE INVENTION

With the foregoing in mind, it is an object of the present invention to provide an improved rotating tool for preventing the vibration of a motor from being transmitted to a spindle as much as possible in a hand tool or a precision hole cutting machine by incorporating a traction drive unit to the tool or machine, so as to assure safety and precision.

It is another object of the present invention to provide a type of traction drive unit suitable for a rotating tool.

Briefly described, in accordance with the present invention, a rotating tool is provided which includes a traction drive unit comprising a unit case having a through-hole, a drive shaft inserted into the through-hole and supported via a rolling bearing at an outer end of the unit case, a plurality of planet rollers positioned between the unit case and the drive shaft, a follower shaft inserted into the through-hole and supported via a rolling bearing at the other outer end of the unit case, means for supporting the plurality of planet rollers at the side of the follower shaft, and means for frictionally rotating the plurality of planet rollers, the means for frictionally rotating including only a hardened inner through-hole surface of the unit case.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
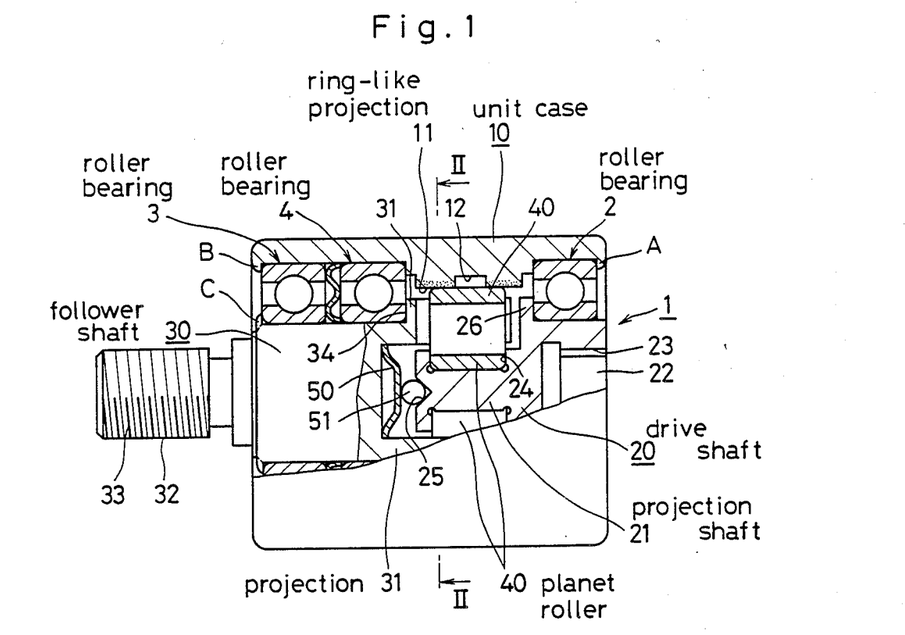
FIG. 1 is a sectional view of a traction drive unit according to a preferred embodiment of the present invention.
Figure 2:
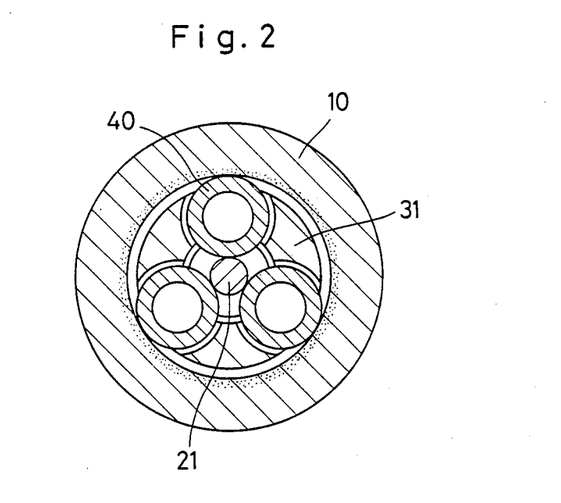
FIG. 2 is a sectional view taken along line II—II of FIG. 1.

FIG. 1 is a sectional view of a traction drive unit 1 according to a preferred embodiment of the present invention. FIG. 2 is a sectional view taken along line II—II of FIG. 1.

The traction drive unit 1 includes a cylindrical unit case 10 to which a fixed race is integrally provided, a drive shaft 20 to which a sun roller shaft is integrally provided, a follower shaft 30 to which a carrier is integrally disposed, and a plurality of hollow planet rollers 40 (three planet rollers in FIG. 2).

At the inner surface of a through hole of the unit case 10, a ring-like projection 11 is provided which projects toward to the center of the through hole. The planet roller 40 is frictionally rotated along the inner surface of the ring-like projection 11. A groove 12 is provided at the axial center of the ring-like projection 11. The groove 12 is provided entirely along the circumference of the through hole. The groove 12 is provided for raising the pressure between the planet roller 40 and the ring-like projection 11 so as to reduce the loss of the power transmission from the drive shaft 20 to the follower shaft 30. An inner portiion inside the ring-like projection 11 (dotted portion) of the unit case 10 is hardened by an induction quenching process or the like while the other portions are not hardened. Preferably, the hardness of the hardened portion is about HRC 60–65 and the depth of the hardened portion is set at about 1 mm when the thickness of the position of the ring-like projection 11 of the unit case 10 is about 6 mm. Preferably, the hardening process includes an induction coil provided at the outer circumference of a portion to be hardened in the unit case 10 to partially heat the portion while cooling water flows into the through hole of the unit case 10 for cooling.

The drive shaft 20 is supported at an open end of the through hole of the unit case 10, via a rolling bearing 2 at the outer end of the shaft 20. At the inner end of the shaft 20, a projection shaft 21 having a small diameter is provided as a sun roller shaft within the inner end of the drive shaft 20. A concave portion 22 is formed at the outer end of the drive shaft 20. The concave portion 22 opens outwardly in the axial direction. A spline groove 23 is provided at the inner circumference of the concave portion 22. Within the concave portion 22, a rotating shaft of a driving source may be coupled in a splining engagement. A guide groove 24 is provided in the projection shaft 21 for guiding the frictional rotation of the planet roller 40.

The follower shaft 30 is supported at the other opening end of the through hole of the unit case 10 via two rolling bearings 3 and 4. The shaft 30 has a plurality of projections 31 (three in FIG. 2) as carriers for supporting the planet roller 40. A projection shaft 32 having a small diameter is provided at the outer side of the unit case 10. A screw groove 33 is formed at the outer side of the projection shaft 32. Any drill or any nut fastening tool may be screwed at the screw groove 33. The projection shaft 21 of the drive shaft 20 is positioned at the inner side of the projections 31 of the follower shaft 30 at an appropriate position so that the inner side of the follower shaft 30 is separated an appropriate distance from the inner side of the projection shaft 21 of the drive shaft 20. A Belleville spring 50 and a ball 51 made of steel are interposed at the space between the follower shaft 30 and the inner side of the projection shaft 21. The Belleville spring 50 is engaged at the root of the projection 31 on the inner side of the follower shaft 30. The ball 51 is positioned within a V-shaped concave 25 provided at the center of the projection shaft 21 of the drive shaft 20, with the resilient force of the Belleville spring 50. Using the Belleville spring 50 and the ball 51, the drive shaft 20 and the follower shaft 30 are prevented from becoming closer to each other.

The planet rollers 40 are rotatably supported between the projections 31 as carriers, so that they are pushed with pressure toward the inner side of the ring-like projection 11 of the unit case 10 and the guide groove 24 of the projection shaft 21 of the drive shaft 20 so as to be frictionally rotated. The planet rollers 40 are hollow so as to provide a suitable interference and reduce the concentration of stress when pressure is applied thereto. To prevent concentration of stress at the inner side of the hollow rollers 40, a hardening process is applied to all portions except the inner side of the hollow planet roller 40, so that the inner side of the hollow planet roller 40 and its inner portions remain soft.

At both sides of the unit case 10, four portions of the circumference are caulked against the outer ring of the bearing 2 for the drive shaft 20 and the outer rings of the bearings 3 and 4 for the follower shaft 30. Therefore, the bearing 2 for the drive shaft 20 is positioned by a caulked portion A at the right edge of the unit case 10 and the right edge of the ring-like projection 11 against the unit case 10. The bearings 3 and 4 for the follower shaft 30 are positioned by a caulked portion B at the left edge of the unit case 10 and the left edge of the ring-like projection 11 against the unit case 10.

Four portions of the circumference at the outer edge of the follower shaft 30 are caulked against the inner ring of the bearing 3 for the follower shaft 30.

The caulked portion C of the follower shaft 30 and the outer side 34 of the projection 31 of the follower shaft 30 fix the follower shaft 30 to the bearings 3 and 4.

The entirety of the drive shaft 20 is hardened, so that no caulking process can be applied to the bearing 2 for the drive shaft 20. Instead, the drive shaft 20 is pressure fixed by baking.

Thus, in the above-described unit case 1, the follower shaft 30 is fixed to the bearings 3 and 4 for the shaft 30, the bearing 3 and 4 being positioned and supported with respect to the unit case 10. The drive shaft 20 is prevented from moving in and out in the axial direction. Instead, with respect to the drive shaft 20, an outward flange 26 of the shaft 20 rests against the inner edge of the inner ring of the bearing 2 for the drive shaft 20, so that the drive shaft 20 is prevented from outwardly moving in the axial direction. Since the drive shaft 20 is prevented from moving toward the follower shaft 30 with only the help of the engagement force with pressure, it may be moved toward the follower shaft 30. However, such a movement can be prevented by the Belleville spring 50 and the ball 51 provided at the space between the drive shft 20 and the follower shaft 30.

Even if the drive shaft 20 is shifted toward the follower shaft 30, the Belleville spring 50 provided at the edge of the drive shaft 20 is pressed so that the elastic resilience of the Belleville spring 50 is applied to the drive shaft 20. Then, the drive shaft 20 is separated from the follower shaft 30, to be returned to an appropriate position in which the outward flange 26 of the drive shaft 20 rests against the inner edge of the inner ring of the bearing 2 for the drive shaft 20. Usually, the elastic resilience of the Belleville spring 50 positions the drive shaft 20 in the appropriate position. Since the Belleville spring 50 and the ball 51 provide approximately a point contact, the rotating loss of both shafts due to their contact is minimized. The position of the point contact is aligned with the central axis of both shafts, so that any rotating vibration of either shafts cannot be affected.

Thus, the caulking enables the bearing 2 for the drive shaft 20, the bearings 3 and 4 for the follower shaft 30, and the follower shaft 30 to be positioned and supported. The Belleville spring 50 and the ball 51 position and support the drive shaft 20. According to the present invention, as compared with the conventional case using a snap ring and a nut, the size of the axial direction can become compact and the manufacturing steps can be reduced since it becomes unnecessary to provide an engagement groove for the snap ring and a screw groove for the nut.

In the case where the guide groove 24 of only the drive shaft 20 is hardened, the outer edge of the drive shaft 20 is caulked against the outer edge of the inner ring of the bearing 2 for the drive shaft 20, so that the drive shaft 20 can be fixed to the bearing 2. In such a case, the Belleville spring 50 and the ball 51 are not necessary. It may be possible to use a nut in order to fix the drive shaft 20 and the follower shaft 30 to their bearings, respectively.

The above-described traction drive unit 1 is operated as follows. When the drive shaft 20 is an input shaft, the planet roller 40 revolves on its own axis and around the drive shaft 20 in response to the rotating of the shaft 20.

The revolution of the planet roller 40 around the drive shaft 20 enables the rotating of the follower shaft 30 via the projection 31. Thus, rotation of the drive shaft 20 can be taken out by rotating the follower shaft at a certain ratio after deceleration in which the traction drive unit 1 can act as a decelerator. When the follower shaft 30 is operated as an input shaft, the rotation of the follower shaft 30 can be accelerated at a certain ratio by that of the drive shaft 20 in which the traction drive unit 1 acts as an accelerator.

Figure 3:
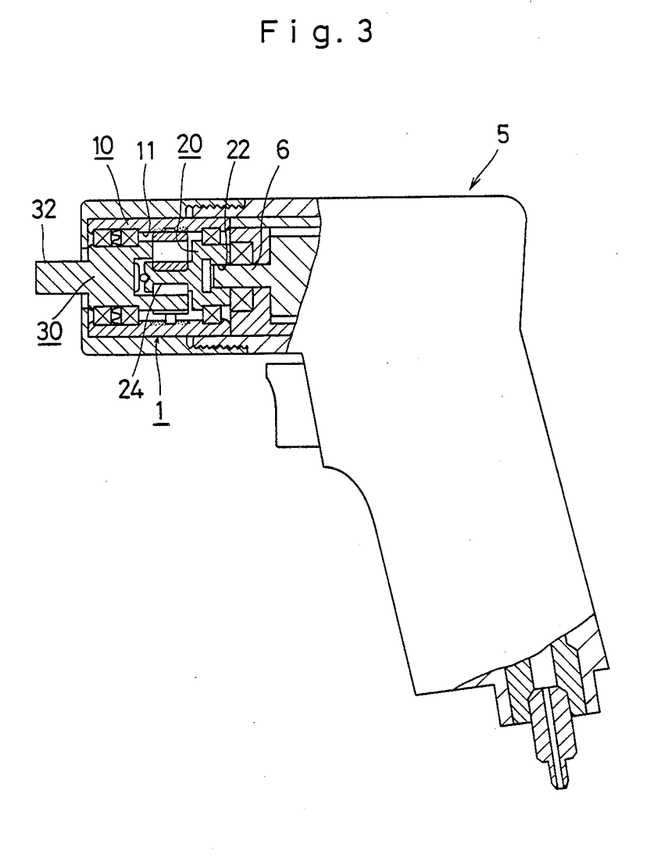
FIG. 3 is a sectional view of a hand drill utilizing the traction drive unit of FIG. 1.

Therefore, as shown in FIG. 3, the traction drive unit 1 can be used as a decelerator of a hand tool such as a hand drill 5. For this purpose, a rotating shft 6 of a motor (for example, an air motor) of the hand drill 5 is coupled to the concave portion 22 of the drive shaft 20 of the traction drive unit 1 in a spline coupling. Any tool is attached to the projection shaft 32 of the follower shaft 30.

In such a hand drill 5, when excessive torque is abruptly applied to the follower shaft 30, the planet roller 40 to be frictionally rotated is slipped within the guide groove 24 of the projection shaft 21 of the drive shaft 20 or the inner face of the ring-like projection 11 of the unit case 10. The force for abruptly stopping the drive shaft 20, which is rotated in unison with the rotating shaft 6 of the motor can be absorbed, so that the operator cannot receive a large shock. With the compact decelerator for the hand drill 5 using the traction drive unit 1, the hand drill 5 is compact so as to improve ease of operability.

Figure 4:
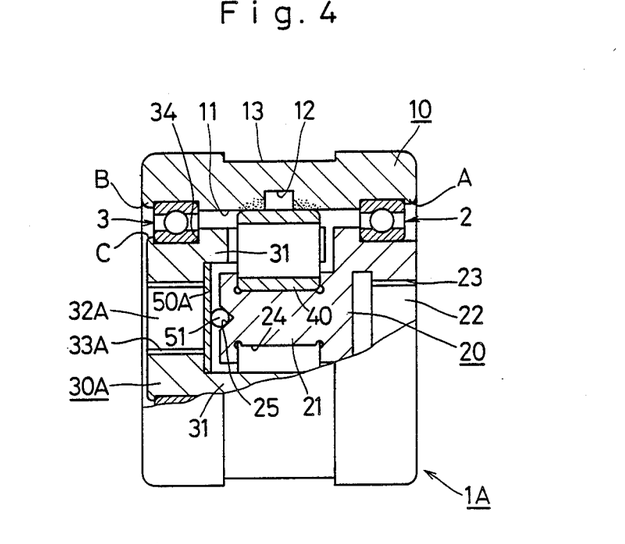
FIG. 4 is a sectional view of a traction drive unit according to another preferred embodiment of the present invention.

FIG. 4 shows a traction drive unit 1A according to another preferred embodiment of the present invention. Like elements corresponding to those of FIG. 1 are denoted by like reference numerals in FIG. 4.

Instead of the projection shaft 32 of the follower shaft 30 in FIG. 1, in the traction drive unit 1A of FIG. 4, a through hole 32A is provided which extends in the axial direction thereof. A spline groove 33 is provided, at the inner side of the through hole 32A, with which the rotating shaft of a motor or any tool can be attached to the follower shaft 30A. The axial length of the follower shaft 30A is shorter than that of the follower shaft 30 in FIG. 1, so that a single rolling bearing 3 can be provided for supporting the follower shaft 30A with sufficient strength. Then, the unit case 10 can be shorter than that shown in FIG. 1.

In the traction drive unit 1A of FIG. 4, dust may be introduced into the frictional rotating portion of the planet roller 40 through the through hole 32A of the follower shaft 30A. A disk plate 50A is provided at the inner opening of the through hole 32A for preventing dust. The disk plate 50A can function as the Belleville spring 50 in FIG. 1 in addition to the dust preventing member. Therefore, it is not necessary to additionally provide any specific Belleville spring. Of course, instead of the disk plate 50A, a Belleville spring may be provided similar to that shown in FIG. 1.

In FIG. 4, at the portion corresponding to the ring-like projection 11 in the outer face of the unit case 10, a circumferential groove 13 is provided whose width is somewhat wider than the axial length of the planet roller 40. The circumferential groove 13 operates as follows. In order to provide the planet roller 40 into a suitable position so as to have a negative degree of interference, the outer face of the unit case 10 may distortedly expand. With the help of the circumferential groove 13, such distorted expansion can occur only at the bottom of the circumferential groove 13, so that the outer size of the unit case can be prevented from changing.

Figure 5:
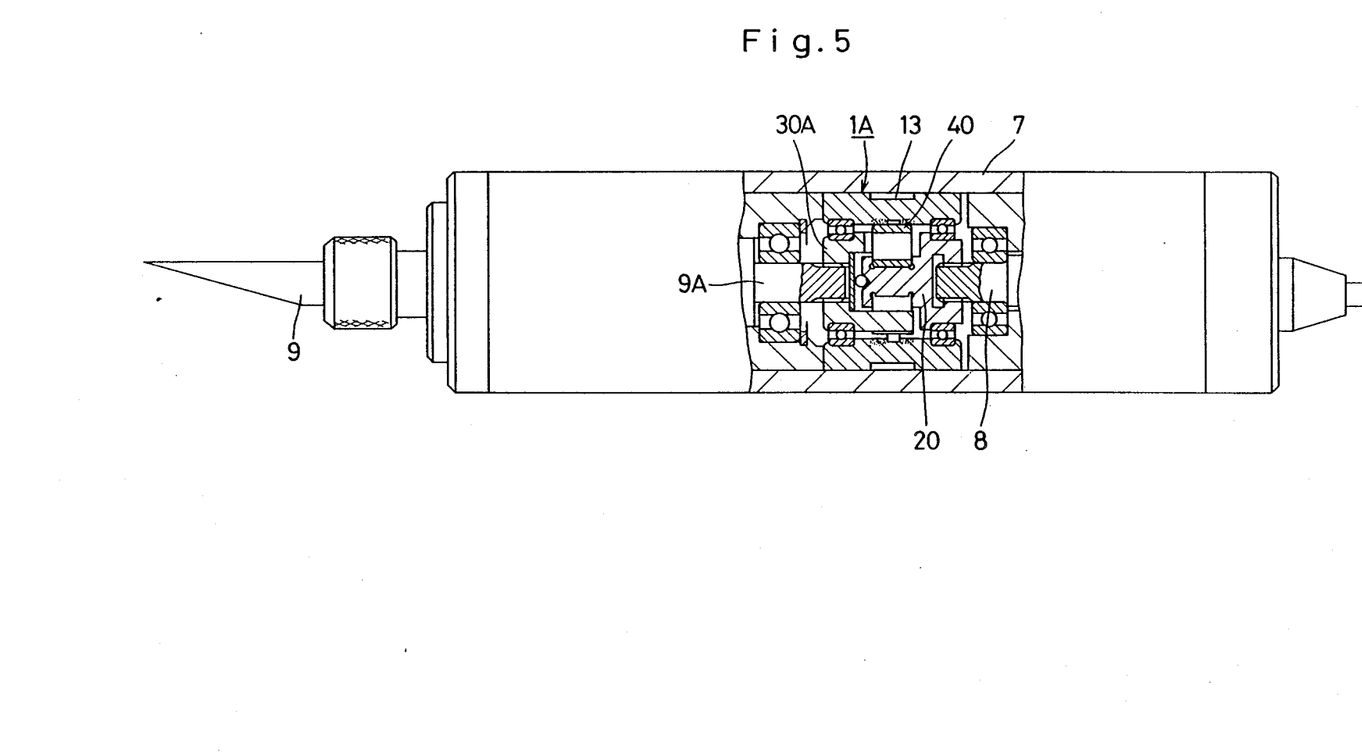
FIG. 5 is a sectional view of a spindle utilizing the traction drive unit of FIG. 4.

The traction drive unit 1A of FIG. 4 can be applied to a decelerator between the rotating shaft 8 of a motor and an edge 9A of a work spindle 9 in the internal portions of a long spindle body 7 as shown in FIG. 5. Due to the compact drive unit 1A, the entirety of the spindle can be made compact. The circumferential groove 13 provided at the outer face of the unit case 10 of the unit 1A can cancel the expansion of the unit case 10, so that the unit case 10 can be precisely and readily adapted to the spindle body 7.

The circumferential groove 13 can be provided in the unit case 10 of the traction drive unit 1 as shown in FIG. 1.

Figure 6A:
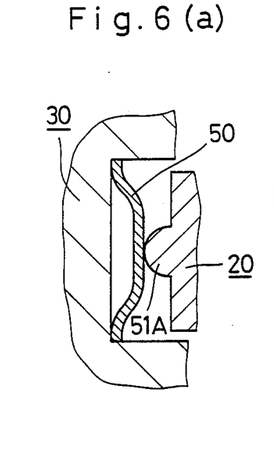
FIGS. 6(a), 6(b) and 6(c) are examples of Belleville springs and balls used for the traction drive units of FIGS. 1 and 4.
Figure 6B:
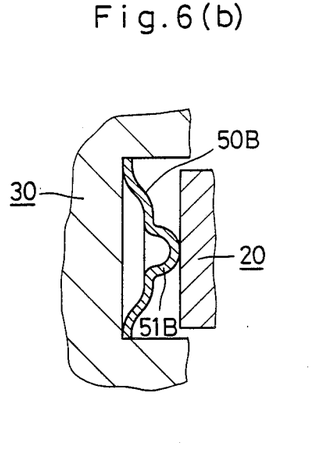
Figure 6C:
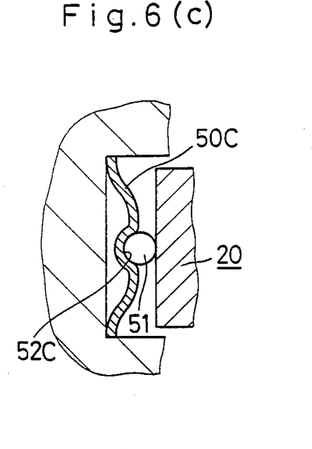

FIGS. 6(a) through 6(c) show other examples of the Belleville spring 50 and the ball 51 for positioning the drive shaft 20 to be applied to the unit case 10 as shown in FIG. 1 or 4. FIG. 6(a) shows a ball projection 51A at the inner side of the drive shaft 20 instead of the ball 51.

FIG. 6(b) shows a ball projection 51B at the axial center of a Belleville spring 50B.

FIG. 6(c) shows a concave portion 52C formed at a Belleville spring 50C on which the ball 51 is supported. These examples can provide the same operations as explained in FIG. 1 or 4.

The present invention can be applied to preferred embodiments other than the traction drive units specifically described above.

As described above, in accordance with the present invention, the following features are summarized with the specific advantageous effects.

(1) According to a first preferred embodiment of the present invention, a traction decelerator of a planet type is interposed between an output shaft and a motor.

When excessive torque is abruptly applied to the output shaft, the planet roller of the traction decelerator of the planet type or the sun roller shaft can be slipped so that the force for abruptly stopping rotation of the motor can be absorbed. Thus, the vibration cannot be generated into the body of the tool or machine. The operator therefore will not drop the tool on account of the transmitted vibration. Further, the vibration of the motor can be reduced by the traction drive of the planet type, so that the direct vibration to the spindle can be restricted. In the precision hole cutting machine, the preciseness of hole cutting can be improved to prevent a metal foil from turning over.

(2) According to a second preferred embodiment of the present invention, the portion only corresponding to the fixed race ring in the unit case, namely, the face of frictional rotation for the planet roller is hardened, so that the remaining portions are prevented from being distorted. Similar to the conventional case, before the hardening process, the face of the frictionally rotated planet roller, attachment faces for the bearings for the drive shaft and the follower shaft as the input and output shafts, and the outer face of the unit case are all machined. However, after the above partial hardening process, only are subjected to grinding. It is unnecessary to grind the attachment faces for the bearings for the drive shaft and the follower shaft and the outer face of the unit case. Further, since the attachment faces for the bearings for the drive shaft and the follower shaft and the sides of the unit case are not hardened, the bearings for the drive shaft and the follower shaft can be readily positioned against the unit case by caulking the unit case to these bearings.

Thus, only the frictionally rotated face of the planet roller necessary to be strengthend in the unit case is hardened. After hardening of this portion, the remaining portions except the hardened portion in the unit case need not to be ground. Therefore, the manufacturing steps can be simplified and reduced in cost. The zone to be ground in the hardened portion, which is generally difficult to be done, is narrowed so that the partial hardening process can be carried out in a short time. Since the bearings for the drive shaft and the follower shaft can be positioned against the unit case by caulking, the manufacturing steps can be simplified and made at a reduced cost.

(3) According to a third preferred embodiment of the present invention, the stopping element (outward flange) is provided in each of the drive shaft and the follower shaft for preventing the drive shaft and the follower shaft from being separated. The outward flange rests against the inner side of the bearing for each of the drive shaft and the follower shaft. Under certain conditions, these shafts may move closer together. The follower shaft has a plate member at portion opposing the inner side of the drive shaft. A projection is disposed on this plate member or the inner side of the drive shaft, the projection being in contact with the center of the opposing shaft of either the drive shaft or the follower shaft. Then, even if either one of the drive shaft or the follower shaft moves toward the other, the plate member is pressed by the projection, so that elastic resistance is applied to these two shafts. Therefore, the shafts are separated from each other, and the stopping elements of the two shafts start to be in contact with the inner sides of the bearings for the two shafts. Finally, the two shafts are positioned and supported at suitable positions.

Since the plate member and the projection provides a contact between a face and a tip, the rotating loss of the two shafts due to the contact can be minimized. Further, the contact position is set at the center of the two shafts, so that their rotating cannot be damaged even if a load in the axial direction is applied to the contact point.

Thus, the plate member and the projection prevent the drive shaft from moving toward the follower shaft. Without a nut unlike in the conventional case, it is unnecessary to provide a screw guide in the drive shaft, thereby reducing the manufacturing cost. Without a nut, the rotating direction of the drive shaft cannot be limited, thus expanding the usage range of the drive unit.

(4) According to a fourth preferred embodiment of the present invention, the circumferential groove is provided in the outer face of the unit case corresponding to the frictionally rotated face of the planet roller for absorbing the expansion of the outer face of the unit case since only the bottom of the circumferential groove is expanded. Therefore, the unit case can be precisely adapted to any attaching member.

While only certain embodiments of the present invention have been described, it will be apparent to those skilled in the art that various changes and modifications may be made therein without departing from the spirit and scope of the present invention as claimed.

What is claimed is:

1. A traction drive unit comprising:
a unit case having a through-hole;
a drive shaft inserted into said through-hole and supported via a rolling bearing at an outer end of said unit case;
a plurality of planet rollers positioned between said unit case and said drive shaft;
a follower shaft inserted into said through-hole and supported via a rolling bearing at the other outer end of said unit case;
means for supporting said plurality of planet rollers at the side of said follower shaft; and
means for frictionally rotating said plurality of planet rollers, said means for frictionally rotating including only a hardened inner through-hole surface of said unit case.

2. A traction drive unit comprising:
a unit case having a through-hole;
a drive shaft inserted into said through-hole and supported via a rolling bearing at an outer end of said unit case;
a plurality of planet rollers positioned between said unit case and said drive shaft;
a follower shaft inserted into said through-hole and supported via a rolling bearing at the other outer end of said unit case;
means for supporting said plurality of planet rollers at the side of said follower shaft;
a stopping element provided at each of said drive shaft and said follower shaft and being in contact with an inner side of each of said drive shaft and said follower shaft for preventing said drive shaft and said follower shaft from being separated;
a plate member provided at said follower shaft opposing the inner side of said drive shaft; and
a projection provided on said plate member or the inner side of said drive shaft, so that said projection is in contact with the center of the opposing shaft of either said drive shaft or said follower shaft.

3. A traction drive unit comprising:
a unit case having a through-hole;
a drive shaft inserted into said through-hole and supported via a rolling bearing at an outer end of said unit case;
a plurality of planet rollers positioned between said unit case and said drive shaft;
a follower shaft inserted into said through-hole and supported via a rolling bearing at the other outer end of said unit case;
means for supporting said plurality of planet rollers at the side of said follower shaft; and
a circumferential groove provided on an outer face of said unit case corresponding to a frictionally rotatable face of said plurality of planet rollers, for absorbing expansion of the outer face of said unit case.

4. A rotating tool comprising:
drive means;
work means; and
a traction drive unit intercoupled between said drive means and work means, said traction drive unit comprising:
a unit case having a through-hole;
a drive shaft inserted into said through-hole and supported via a rolling bearing at an outer end of said unit case;
a plurality of planet rollers positioned between said unit case and said drive shaft;
a follower shaft inserted into said through-hole and supported via a rolling bearing at the other outer end of said unit case;
means for supporting said plurality of planet rollers at the side of said follower shaft; and
means for frictionally rotating said plurality of planet rollers, said means for frictionally rotating including only a hardened inner through-hole surface of said unit case.

5. A rotating tool comprising:
drive means;
work means; and
a traction drive unit intercoupled between said drive means and work means, said traction drive unit comprising:
a unit case having a through-hole;
a drive shaft inserted into said through-hole and supported via a rolling bearing at an outer end of said unit case;
a plurality of planet rollers positioned between said unit case and said drive shaft;
a follower shaft inserted into said through-hole and supported via a rolling bearing at the other outer end of said unit case;
means for supporting said plurality of planet rollers at the side of said follower shaft;
a stopping element provided at each of said drive shaft and said follower shaft and being in contact with an inner side of each of said drive shaft and said follower shaft for preventing said drive shaft and said follower shaft from being separated;

a plate member provided at said follower shaft opposing the inner side of said drive shaft; and a projection provided on said plate member or the inner side of said drive shaft, so that said projection is in contact with the center of the opposing shaft of either said drive shaft or said follower shaft.

6. A rotating tool comprising:

drive means;

work means; and a traction drive unit intercoupled between said drive means and work means, said traction drive unit comprising:

a unit case having a through-hole;

a drive shaft inserted into said through-hole and supported via a rolling bearing at an outer end of said drive shaft;

a plurality of planet rollers positioned between said unit case and said drive shaft;

a follower shaft inserted into said through-hole and supported via a rolling bearing at the other outer end of said unit case;

means for supporting said plurality of planet rollers at the side of the follower shaft; and a circumferential groove provided on an outer face of said unit case corresponding to a frictionally rotatable face of said plurality of planet rollers, for absorbing expansion of the outer face of said unit case.

* * * * *